United States Patent [19]

Fischer et al.

[11] 4,044,512
[45] Aug. 30, 1977

[54] METHOD AND ARRANGEMENT FOR ANCHORING AN OBJECT TO A SUPPORT STRUCTURE

[75] Inventors: Artur Fischer; Klaus Fischer, both of Tumlingen, Germany

[73] Assignee: Artur Fischer, Tumlingen, Germany

[21] Appl. No.: 631,153

[22] Filed: Nov. 11, 1975

[30] Foreign Application Priority Data

| Nov. 14, 1974 | Germany | 2453957 |
| June 6, 1975 | Germany | 2523198 |
| June 6, 1975 | Germany | 2525220 |
| June 7, 1975 | Germany | 2525452 |
| June 14, 1975 | Germany | 2526744 |
| June 21, 1975 | Germany | 2527773 |

[51] Int. Cl.² ............................................. E04B 1/41
[52] U.S. Cl. ....................................... 52/127; 52/704; 52/744
[58] Field of Search ..................... 52/704, 744, 127

[56] References Cited

U.S. PATENT DOCUMENTS

| 1,564,947 | 12/1925 | Copeman | 52/704 |
| 2,092,341 | 9/1937 | De Vries | 52/704 |
| 2,930,199 | 3/1960 | Jarund | 52/704 X |
| 3,108,404 | 10/1963 | Lamb | 52/704 X |
| 3,282,015 | 11/1966 | Rohe et al. | 151/14.5 X |
| 3,308,585 | 3/1967 | Fischer | 52/704 X |
| 3,379,019 | 4/1968 | Williams | 52/704 X |
| 3,532,316 | 10/1970 | Mathes | 52/744 |
| 3,566,947 | 3/1971 | Jukes | 85/83 |

Primary Examiner—Alfred C. Perham
Attorney, Agent, or Firm—Michael J. Striker

[57] ABSTRACT

A method and arrangement for anchoring an object to a support structure having an anchoring hole includes inserting into the anchoring hole an anchoring member slightly smaller than the latter so that a clearance is formed in the anchoring hole about the exterior of the anchoring member, mounting a cap member in the anchoring hole and about an anchoring member so as to fix the latter in position in the anchoring hole, providing a flow-through passage which is in communication with the clearance on at least one of the cap and/or anchoring members, and injecting a hardenable substance through the flow-through passage and from there into the clearance so that the substance forms a plug about the anchoring member and fixes the same in the anchoring hole upon hardening.

34 Claims, 12 Drawing Figures

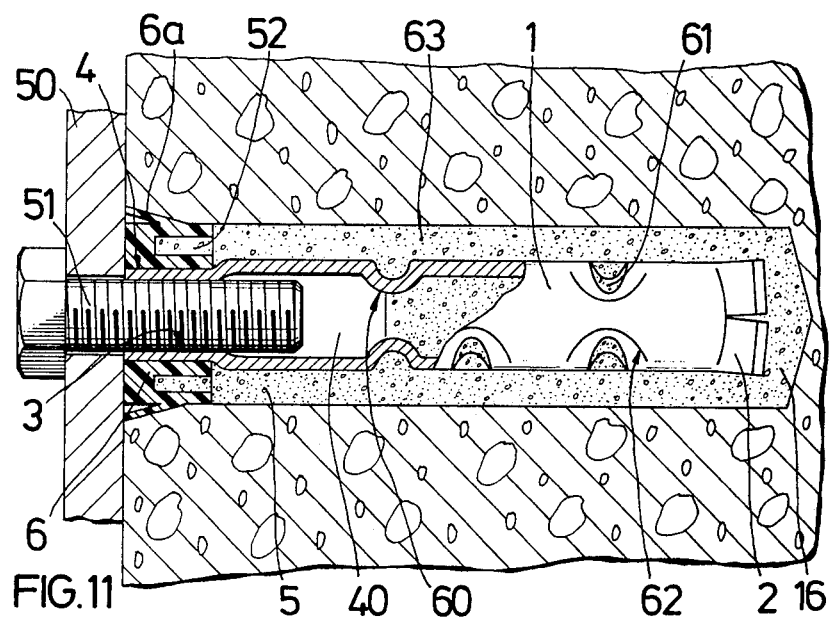
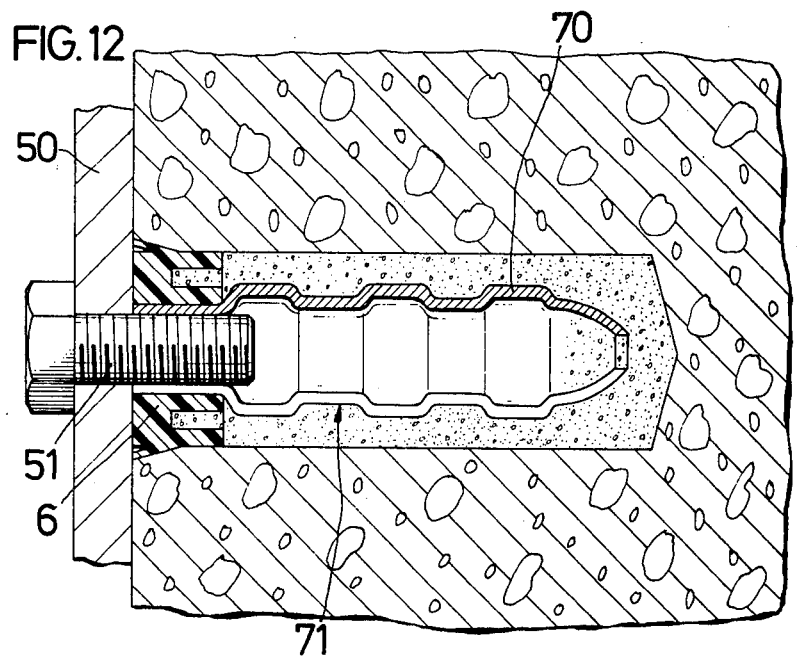

METHOD AND ARRANGEMENT FOR ANCHORING AN OBJECT TO A SUPPORT STRUCTURE

BACKGROUND OF THE INVENTION

The present invention relates to a method and an arrangement for anchoring an object to support structure and, more particularly, to the secure mounting of an object to a low-strength support structure, such as a porous masonry wall or a block-type structure having interior hollow cavities, by filling an anchoring hole with a hardenable substance.

In general, prior art has encountered very serious difficulties when attempting to mount an object, such as a cladding panel, onto a low-strength support structure. It is generally known in the prior art to utilize sleeve-shaped dowels which have a squashed or compressed leading end that is bent backwardly in the form of hook-like curvatures for increasing the anchorage effect. After a large-sized hole has been provided in the support structure and filled with a hardenable bonding substance, such a a quick-setting cement mixture, the smaller-sized dowel or anchoring member is inserted into the still soft cement mixture. In this prior art approach, the hook-like curvatures are relied upon to prevent the cement mixture from entering the interior bore of the dowel.

However, the prior art technique has not proven altogether effective in preventing the cement mixture from flowing into the dowel. This is particularly disadvantageous because the cement blocks the interior bore of the dowel and prevents the insertion of a mounting screw. Moreover, the known techniques are suitable only for fastening objects to the ground, that is, those cases in which the hardenable substance is prevented by gravity from flowing out of the anchoring hole before the substance has hardened. Upon insertion of the dowel after the anchoring hole has been filled with cement, the cement tends to flow therefrom and will smear the exterior of the support structure. Thus, the known methods are particularly unsuitable for mounting objects to vertical walls and/or ceilings.

In addition, the known prior art methods entail the risk that the dowel will sink down into the still soft cement mixture due to its own inherent weight. To prevent this undesired change in position, the prior art requires one to hold the dowel in position until the cement mixture has set, or to use expensive holding devices. Thus, in the case of the large-scale manufacture of precast concrete parts, the dowels are held in position by spikes arranged on sheeting boards, the spikes projecting into the interior bore of the dowels for a time sufficient for the cement mixture to set.

Moreover, the prior art has not adequately dealt with the problem of air pockets formed in the hardenable substance which tend to weaken the anchorage.

SUMMARY OF THE INVENTION

Accordingly, it is the general object of the present invention to overcome the disadvantages of the prior art.

An additional object of the invention is to securely anchor an object to a support structure, particularly to vertical walls and/or ceilings, by injecting a hardenable substance into an anchoring hole.

A further object of the invention is to prevent the outflow of the hardenable substance from the anchoring hole.

Still another object of the present invention is to prevent the formation of air pockets in the hardenable substance during its injection.

Yet another object of the invention is to keep at least a portion of the interior bore of the dowel free of the hardenable substance so that a mounting screw can be easily inserted into the dowel.

In keeping with these objects, and others which will become apparent hereinafter, one feature of the invention resides in providing an anchoring hole in the support structure. An anchoring member which is slightly smaller than the anchoring hole is inserted therein so that a clearance is formed in the anchoring hole about the exterior of the anchoring member. A cap member is mounted in the anchoring member so as to fix the latter in position in the anchoring hole. A flow-through passage which is in communication with the clearance is provided on at least one of the cap and/or anchoring members. Moreover, a hardenable substance is injected through the flow-through passage and from there into the clearance.

These features assure that an object is securely mounted and anchored to the support structure upon the hardening of the substance. Moreover, the cap member, which is mounted about the anchoring member and then inserted together therewith into the anchoring hole, closes the clearance and aids in preventing eventual outflow of the still-fluid substance. This is especially desirable in mounting objects to vertical walls and/or ceilings. Simultaneously, the cap member centers the anchoring member in position and holds it in this position, because the cap member is slightly larger than the anchoring hole and is thus frictionally wedged therein. Thus, it is no longer necessary to hold the anchoring member in position until the substance has hardened.

Also in accordance with the invention, the flow-through passage may either be located at the leading end of the anchoring member and/or at the trailing end of the cap member. Moreover, the entire clearance may be filled by providing venting means to properly ventilate the anchoring hole. Air bubbles otherwise trapped by the injected substance can escape through narrow slits provided on the cap member. The narrowness of the slits prevents the substance itself from flowing therethrough, and it is only necessary to close the flow-through passage by utilizing either a direct cover, or valve means, or other suitable closure means.

Particularly in the case where an object is to be anchored to a ceiling, an extension portion is provided on the cap which accommodates a ventilating slit and which extends inwardly towards the bottom of the anchoring hole. This permits air to vent from the hole, even though the substance tends to accumulate directly above the cap member, up until the time the entire clearance has been filled. The cross-sectional profile of the extension portion may be either U- or V-shaped, so long as the open side thereof lies alongside the circumferential wall of the anchoring hole or alongside the exterior of the anchoring member. In the case where an object is to be anchored on a vertical wall, the uppermost slit always remains open to ventilate the hole until the clearance is completely filled.

Still another feature of the invention resides in providing a flange portion on the cap member to serve as a limiting stop and to prevent the cap and the anchoring from being introduced too far into anchoring hole during the initial insertion or during the injection process by the pressure force exerted by the injection device.

The cap member is constituted of resilient synthetic plastic material so as to facilitate its secure mounting in the hole and to compensate for any unevenness occuring at the mouth of the hole. In order to further improve its resilience, an annular groove is provided in the cap member. Subsequently, as the clearance is filled, the groove is also filled with the substance which will form a hard core which serves to firmly support the mouth of the hole and absorb high bending or shearing forces.

An additional feature of the invention is to keep at least a portion of the interior of the interior bore of the anchoring member free of any substance so that an anchoring screw may be easily mounted therein. A valve may be positioned either in the flow-through passage provided at the leading end of the anchoring member or upstream thereof. Alternatively, a synthetic plastic material sleeve element is inserted into the interior bore of the dowel until its tapered leading end sealingly engages against the dowel. This seal prevents the substance from obstructing the interior bore of the dowel.

After the substance has set, the sleeve element and the core of hardened material contained therein is pulled out and discarded. The sleeve element is made of very cheap, thin-walled plastic material so that its cost is negligible in comparison with that of the anchoring member.

The leading end of the sleeve element may also be provided with a valve closure which is particularly desirable when an object is to be mounted to a ceiling, or when the hardenable substance is not very viscous and takes a long time to set.

Another feature of the invention is to provide stoppers which are connected to the sleeve element and/or to the cap member by means of an injection-molded thread. This prevents one from losing or misplacing the stopper.

Still an additional feature of the invention is to screw a synthetic plastic, injection-molded material insert element into the interior bore of the anchor member. The insert element has an internal thread which is adapted to receive a wood-type screw. The insert element may be simply manufactured in many different sizes. In contrast, the anchoring member is constituted of metal material, and it generally suffices to manufacture only a few standard sizes. If a user requires a particular type of anchoring screw, then he can select the appropriately-sized insert element which is adapted to be screwed into the anchoring member. Generally, the interior bore of the anchoring member is provided with an interior thread which is suitable only for the screwing in of machine screws, and such machine screws generally have a limited variation of head shapes. Since the insert element also enables wood screws to be used which generally have a much greater selection of head shapes, greater flexibility in mounting an object is achieved.

A feature of the insert element provides it with an interior passageway having an interiorly tapered front end. When the anchoring screw is screwed in, it exerts a force on this tapered front end and an even greater expansion effect and wedging of the insert element in the interior bore of the anchoring member is realized. A further increase in the anchorage effect is achieved if the insert element is slit from its front end over a portion of its length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 11 is a partial side view in vertical section of a modification of the anchoring member; and FIG. 12 is a partial side view in vertical section of another modification of the anchoring member.

DESCRIPTION OF THE PREFERRED EMBODIMENTS

Figure 1:
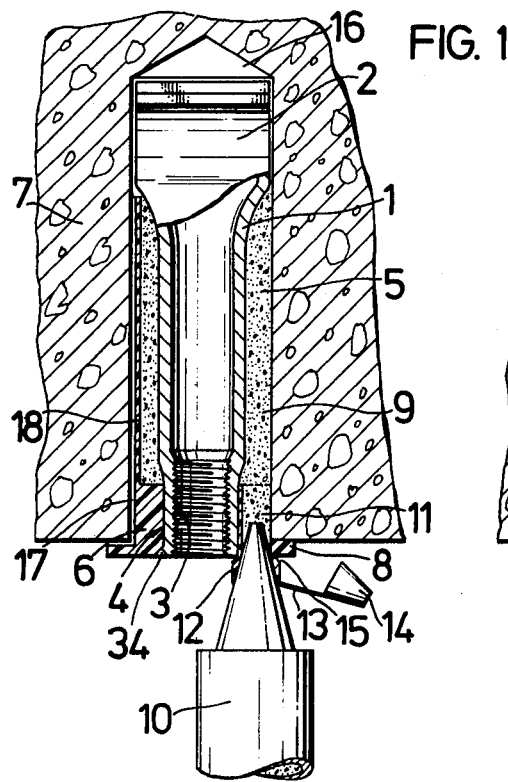
FIG. 1 is a partial side view in vertical section of the arrangement according to a first embodiment of the invention.

Referring jointly to the method and the arrangement for anchoring an object to a support structure having an anchoring hole, it will be seen that, in the first embodiment of FIGS. 1-4, the reference numeral 1 identifies an anchoring member or dowel 1 slightly smaller than the anchoring hole 16 provided in the support structure 7. The dowel 1 has a front leading end 2 which is squashed flat and is bent in the form of a hook or barb to increase the anchorage effect. The dowel 1 also has a sleeve-shaped portion located adjacent the leading end 2 and a reduced diameter trailing end portion 4 having an internal threaded section 3 for receiving a threaded anchoring screw.

A cap member 6 is mounted in the hole 16 and about the dowel 1 and closes the clearance 5 formed in the hole 16 about the exterior of the dowel 1. The cap 6 has a sleeve-shaped portion having a larger diameter than said hole 16, so as to frictionally wedge the cap 6 therein without marring the interior surface of the hole 16, thereby fixing the dowel 1 in position in the hole 16 so that an object may be anchored to the structure 7 at any time.

The cap 6 has a trailing end provided with a flange portion 8 which engages the outer surface of the support structure 7, and thereby limits the extent of insertion of the cap 6 and the dowel 1.

Figure 2:
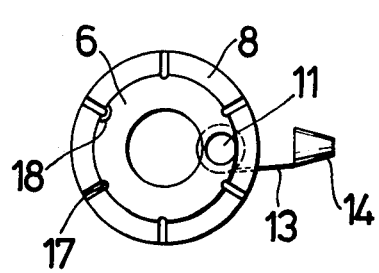
FIG. 2 is a rear view of the member of FIG. 1.
Figure 4:
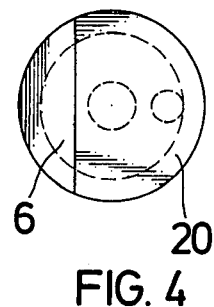
FIG. 4 is a front view of the detail shown in FIG. 3.

A flow-through passage 11 is provided on the cap 6, or more clearly seen in FIG. 2. The passage 11 provides communication between the clearance 5 and the exterior of the support structure 7. A pressurized injection device 10 having a conically shaped nozzle is inserted into the flow-through passage 11 and injects a hardenable substance 9 therethrough, under pressure, into the clearance 5 so that the substance 9 forms a plug about the dowel 1 and fixes the same in the hole 16 upon hardening of the substance 9.

To simplify the insertion of the nozzle, a conical part 12 having a conically-shaped interior portion extends outwardly of the flange portion 8 and cooperatively receives the nozzle of the device 10. An injection-molded stopper 14, which is connected to the conical part 12 by means of an injection-molded thread 13, is used to close the conically-shaped interior portion after the injection of the substance 9 has been completed. Subsequently, after the substance 9 has set, the conical part 12 and the stopper 14 may be driven into the cap 6. This knocking-in action is faciliated by the circumferential groove 15 provided on the conical part 12 adjacent the flange portion 8.

In order to avoid the formation of air pockets in the substance 9, that is, in order to be able to completely fill the hole 16 with substance 9, venting of the hole 16 is required. The venting means for discharging air from the interior towards the exterior of the hole 16 during the filling of the clearance 5 comprises at least one and preferably a plurality of narrow slits or needle-like ventilation openings 17 arranged on the exterior surface of the cap 6. Each slit 17, which is produced with relative ease, has an axially-directed section on the sleeve-shaped portion of the cap 6, and a radially directed section on the underside of the flange portion 8 which abuts against the structure 7, which extends all the way to the edge of the rim of the flange portion 8.

In the particular situation wherein the structure 7 is a ceiling, the force of gravity tends to cause the substance 9, which may be, for example, a quick-setting cement mixture or an adhesive, to accumulate at the cap 6, that is directly above the flow-through passage 11. In such a case, the ventilation slits 17 may be obstructed. In order to overcome the closing of the slits 17, a tube-like extension portion 18 is provided on the cap 6 and extends into the hole 16 towards the bottom thereof. At least one of these slits 17 extends along the extension portion 18, and the cross section of the extension portion 18 may be U- or V-shaped so long as the open side of the extension portion 18 faces the circumferential wall of the hole 16.

After the injection process has been terminated and the hardenable substance has set, the object to be secured to the support structure is anchored thereto by means of an anchoring screw which is screwed into the interior threaded section 3 of the dowel 1. If an anchor bolt is cemented in the support structure 7, then the object is secured by screwing a nut onto the threaded section of the anchor bolt which projects outwardly of the hole.

In FIG. 2, the underside of the cap 6 is shown with a plurality of slits 17 arranged in a star-shaped pattern.

Figure 3:
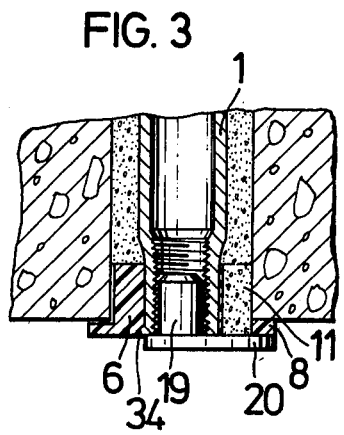
FIG. 3 is a partial side view in vertical section of another detail of the arrangement according to the first embodiment shown in FIG. 1.

FIG. 3 illustrates another method of closing the clearance 5 after the substance 9 has been injected through the flow-through passage 11 provided in the cap 6. A closure member comprises a circular segmented disc 20, see FIG. 4, which is movable from a first position in which it covers the passage 11 towards a second position in which it uncovers the passage, and an axially-extending stem portion 19. The stem portion 19 is received into the interior bore of the dowel 1 and permits the disc 20 to be rotated thereabout. Thus, the substance 9 can be introduced via passage 11 and, as soon as the injection process is terminated, the passage 11 is closed by turning the disc 20. After the substance 9 has set, the closure member 19, 20 is removed.

Figure 5:
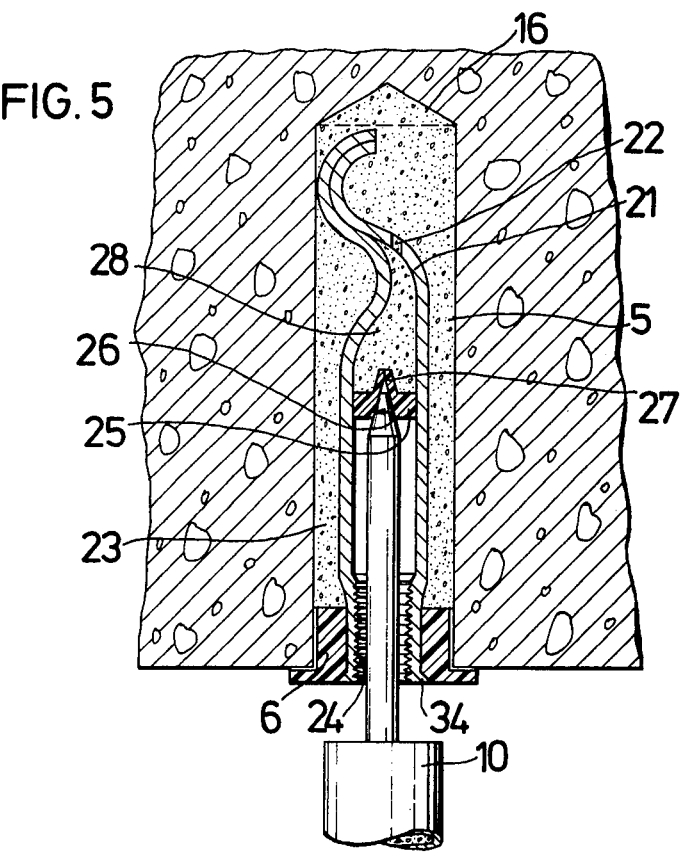
FIG. 5 is a partial side view in vertical section of the arrangement according to a second embodiment of the invention.

In the embodiment of FIG. 5, a dowel 21 is received in the hole 16 and forms a clearance 5. A cap member 6 is frictionally mounted in the hole 16 and about the dowel 21 so as to fix the latter in position. Instead of providing the flow-through passage on the cap 6, as in the case of the embodiment of FIGS. 1-4, the flow-through passage 22 is provided on the dowel 21 at the leading end 28 thereof. The passage 22 communicates with the clearance 5 and also with the interior bore 23 of the dowel 21. Thus, when an injection device 10 is inserted into the bore 23, the substance 9 is injected through the flow-through passage 22 towards the clearance 5 so as to fix the dowel 21 in the hole 16.

To keep the trailing end of the dowel 21 free of hardenable substance, a stoppage valve 25 having resilient valve flaps 27 bounding a conical center hole 26 is provided in the bore 23 downstream of the trailing end of dowel 21 which includes the inner threaded section 24. The nozzle of the device 10 is received in the center hole 26, and the substance is injected therethrough under pressure forcing the flaps 27 apart. After the leading end 28 is filled, the clearance 5 is subsequently filled. The valve flaps 27, which taper to a point, close when the device is withdrawn and prevents the substance from blocking the threaded section 24 and obstructing the entrance of an anchoring screw therein.

The flow-through passage 22 of FIG. 5 is also suitable to be used to ventilate the hole 16 when the substance is being fed through the flow-through passage 11 provided in the cap 6, especially in the case when the structure is a ceiling. In this case, it is not necessary to provide an extension portion 18 on the cap 6, as described in connection with FIG. 1.

Figure 6:
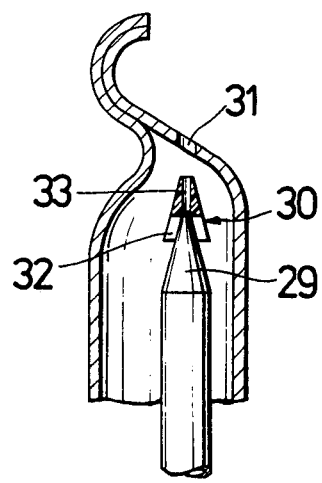
FIG. 6 is a partial side view in vertical section of a modified arrangement of the embodiment of FIG. 5.

Instead of mounting the stoppage valve 25 upstream of the flow-through passage, FIG. 6 shows another possibility wherein a cone-shaped valve 30, which is placed on the nozzle 29 of the device 10, is inserted in the flow-through passage 31 after the injection process has been terminated. The center hole 33 is bounded by flaps made resilient by the slit 32 so that the valve 30 closes the flow-through passage 31 upon removal of the nozzle 29.

To make a firmer joint between the cap 6 and the dowel 1, 21 of FIGS. 1 and 5, respectively, the trailing end of the dowel is flanged over and thereby held on the synthetic plastic material cap 6 by the attachment means 34. A unit is thereby produced by this attachment of the cap 6 and dowel 1, 21 which facilitates their mutual insertion into the hole 16.

The hardenable substance may be any substance which hardens, such as conventional cement mixtures, adhesive mixtures, or any foamable plastics material such as polyurethane which is comprised of at least two component parts which are mixed together in the nozzle of the device 10 where the foaming process begins, or any other settable material.

Figure 7:
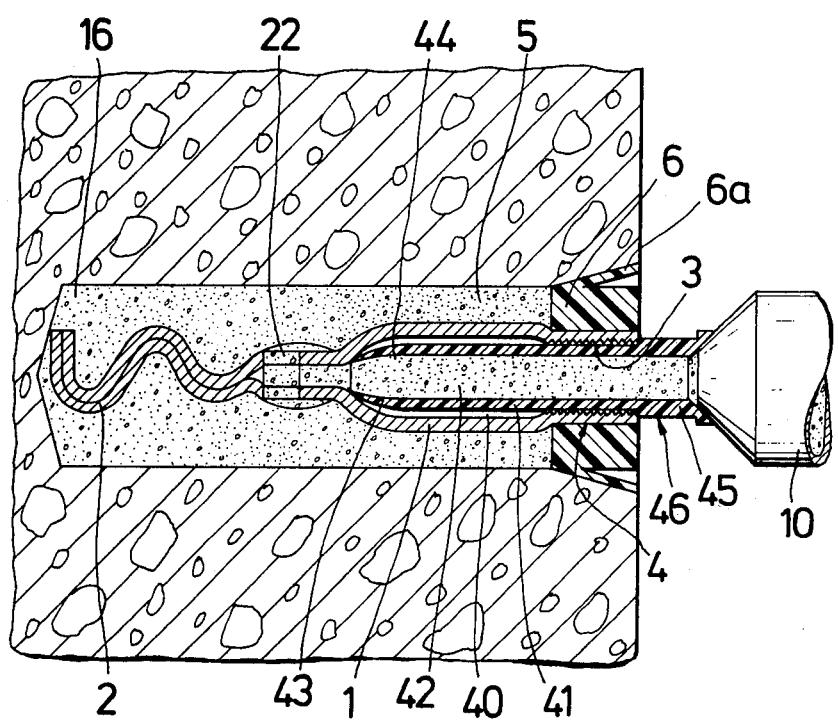
FIG. 7 is a partial side view in vertical section of another modified arrangement of the embodiment of FIG. 5.

In FIG. 7, the dowel 1 has a front end 2 which is squashed flat and bent into a curvilinear pattern to increase the anchorage effect. The synthetic plastic material cap 6 has a resilient sealing lip 6a located exteriorly of the sleeve-shaped portion of the cap 6 which reliably seals the hole 16 even when the mouth of the hole 16 is broken away.

Before the clearance 5 is filled by means of the flow-through passage 22, a plastic material sleeve element 41 is inserted into the interior bore 40 of the dowel 1 until the tapered leading end 43 of the sleeve element 41 abuts against the dowel 1 to seal the interior bore 40.

The rear end 46 of the sleeve element 41 has a collar 45 which abuts against the trailing end face of the dowel 1 and tends to absorb excess pressure exerted on the sleeve element 41 caused by the injection device 10 during the injection process. The collar 45 has a predetermined length which permits the gripping by a tool, such as a pair of pliers, for pulling the sleeve element 41 out of the interior bore 40. To prevent the pliers from slipping off, the collar 45 is provided with a roughened surface part 46.

In operation, the nozzle of the device 10 is pressed against the wide chamfered end of the collar 45 so that a good seal is made thereat, and the hardenable substance is then injected through the interior passage 44 of the sleeve element 41 and from there through the flow-through passage 22 in the dowel 1 and thereupon into the clearance 5. After the substance 9 has set, the sleeve element 41 is removed together with the core 42 of hardened substance contained within the interior passage 44 of the sleeve element 41. The interior bore 40 of the dowel 1 is thus left clear, and the threaded section 3 is free to receive an anchoring screw.

By pressing on the device 10 during the injection of substance 9, the tapered end 43 is wedged against a tapered portion on the dowel 1. The tapered end 43 also shapes the core 42 to have a corresponding taper which facilitates the removal of the core 42 when the sleeve element 41 is withdrawn from the interior bore 40 of the dowel 1.

Figure 8:
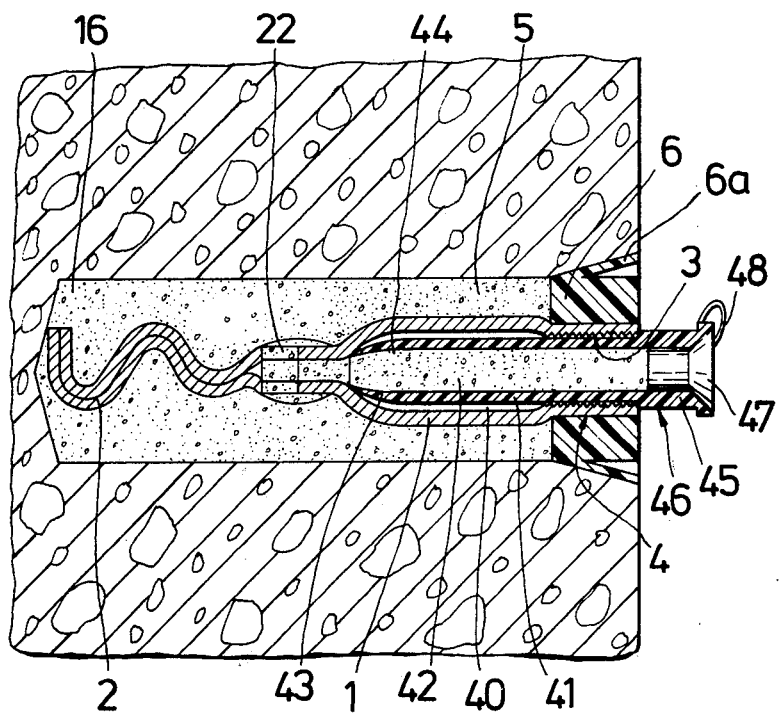
FIG. 8 is a partial side view in vertical section of FIG. 7 showing an additional detail of the arrangement.

The arrangement of FIG. 8 is substantially the same as the one illustrated in FIG. 7, and like reference numerals identify like parts. After the substance 9 has filled the clearance 5, the injection device 10 is removed and the trailing end 46 of the sleeve element 41 is closed by covering means which comprises a covering cap 47 connected to the sleeve element 41 by means of an injection-molded thread 48. Especially in the case of ceiling structures, the still-fluid hardenable substance cannot flow outwardly of the hole 16.

Figure 9:
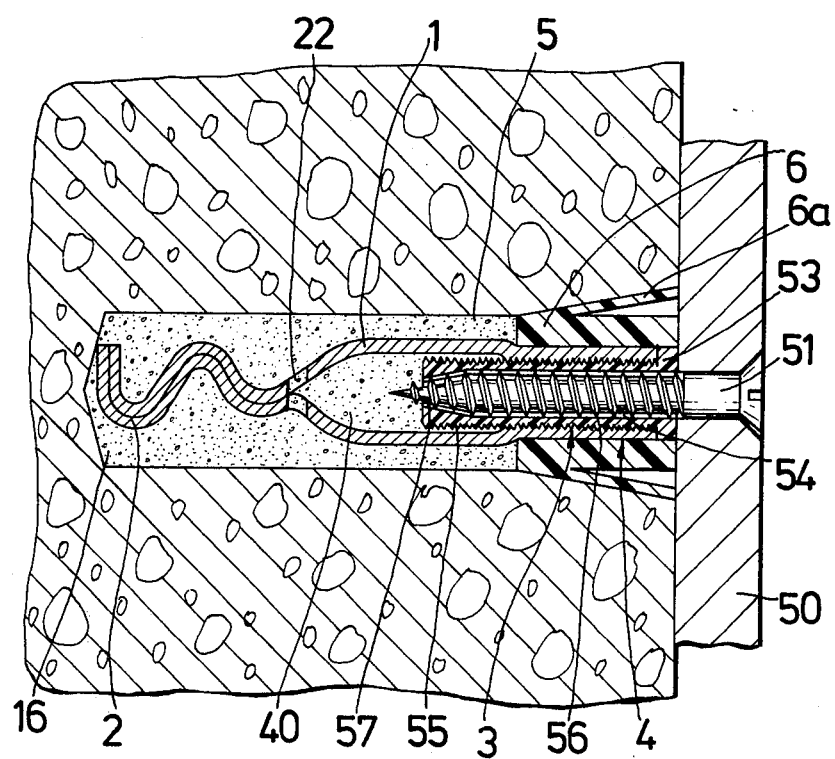
FIG. 9 is a partial side view in vertical section of still another modification of the embodiment of FIG. 5.

If it is desired to use a screw having a wood screw pitch, such as the screw identified by reference numeral 51 in FIG. 9, to mount an object 50 to a support structure, then instead of threading the screw directly into the interior threaded section 3 of the dowel 1, one inserts a plastic sleeve or insert element 56 after the hardenable substance has set. The insert 56 has an externally threaded portion 55 having a pitch fashioned after the interior threaded section 3 of the reduced diameter portion 4 of the dowel 1 and is screwed therein until its trailing limiting flange 53 engages the trailing end face of the dowel 1. The interior passageway of the insert 56 has an internally tapered leading end 57, and longitudinally extending ribs 54 which permit the wood screw 51 to be tapped and screwed therein. A firm anchorage is thereby produced to prevent withdrawal by the wedging engagement between dowel 1 and insert 56.

Figure 10:
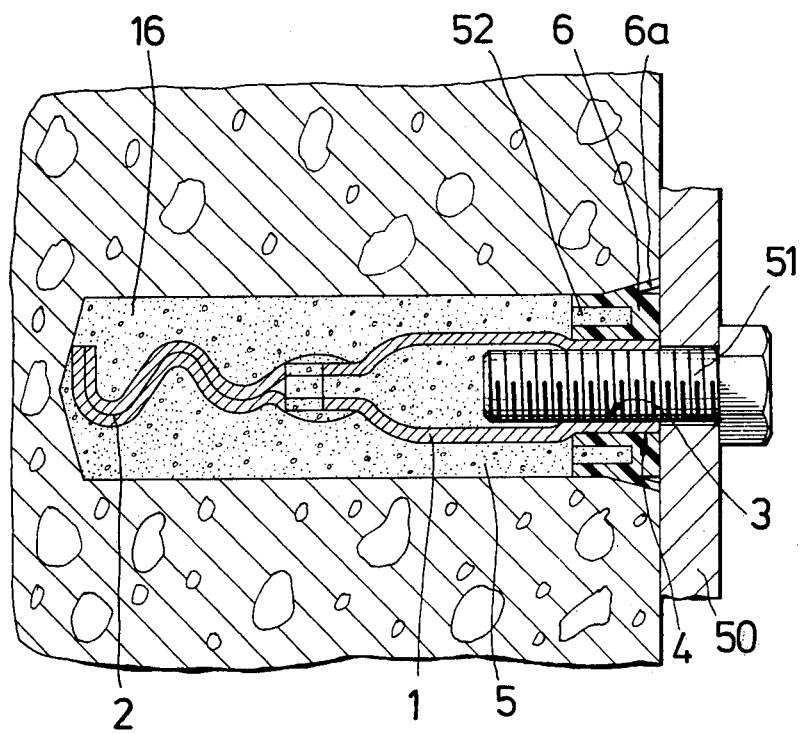
FIG. 10 is a partial side view in vertical section of a modification of the cap member.

In contrast to the wood screw shown in FIG. 9, the machine screw 51 of FIG. 10 is screwed into the interior threaded section of the dowel 1. Moreover, the cap 6 now has an annular groove 52 arranged concentrically to its sleeve-shaped portion which has an open end facing the clearance 5 and a depth which extends axially almost to the trailing end face of the cap 6. During the injection process, the substance 9 also fills the groove 52 and forms a solid core therein upon hardening so as to more fixedly retain the cap 6 in the hole 16.

FIG. 11 illustrates an object 50 already mounted on the support structure. Prior to this condition, a sleeve element, such as the one identified by reference numeral 41 in FIG. 7, is inserted into the interior bore 40 of the dowel 1 before the substance 9 is injected into clearance 5 until the leading end of the sleeve-element 41 abuts against the constriction or radially constricted neck portion 60 of the dowel 1 so as to form a seal. The portion of the dowel 1 adjacent the constriction 60 may be the same length for all applications, regardless of the total length of the dowel. This seal prevents any injected substance from flowing backwardly to the interior threaded section 3.

Thereupon, the substance is injected through the sleeve element 41 by the device 10 which is placed at the trailing end of the sleeve element 41. The substance laterally flows through the openings or flow-through passages 61 which are spaced axially along the length of the dowel 1. The passages 61 are formed preferably by perforating the indentations 62 which are impressed tangentially into the exterior wall of the dowel 1. As a result, the cross section of the rear space 63 in the clearance 5 is reduced only slightly so as to assure a good flow of the substance 9 thereto.

When the hole 16 is filled, the substance also penetrates into the indentations 62. Thus, the distribution of the indentations 62 over the entire or substantially the entire axial length of the dowel 1 permits very high anchorage values to be obtained. These values may be further increased by additionally roughening the surface of the dowel 1.

By the lateral arrangement of a plurality of flow-through passages 61, the total opening area is increased and the cross section of each individual passage 61 is reduced. The substance is not only thereby injected in a much shorter time, but also may be injected with a comparatively lower pressure than heretofore. The reduction in the cross section of the dowel 1 itself is of little consequence, and the anchorage is vastly improved because of the more uniform filling of the clearance 5.

The feature of forming the passages 61 by perforating the indentations 62 permits the passages to be produced in one working operation. If the stamping dies tangentially engage the dowel wall, then no molds are needed to produce the indentations or to perforate the passages 61. This feature is especially desirable when the dowel is made from a tubular blank.

After the substance has set, the sleeve element 41 is removed from the interior bore 40 together with the core of hardened substance contained therein. The trailing end of the dowel 1 is now empty for permitting the screwing in of the screw 51.

Finally, in FIG. 12, the dowel 70 need not be circumferentially complete but can be made by rolling a sheet metal blank, preferably of tin, into a cylindrical configuration after the depressions 71 and lateral flow-through passages have already been provided therein. If the ratio of the depth of the depression to its width, or to the distance between two depressions, is approximately 1:5, then especially high anchoring values are achieved. In FIG. 12, the lateral flow-through passages are not needed, since the front leading face of the dowel 70 is open.

It will be understood that each of the elements described above, or two or more together, may also find a useful application in other types of constructions differing from the type described above.

While the invention has been illustrated and described as embodied in a method and arrangement for anchoring an object to a support structure, it is not intended to be limited to the details shown since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for anchoring an object to a support structure having an anchoring hole, comprising an anchoring element including an anchoring member of transverse dimensions smaller than, and a cap member of transverse dimensions substantially corresponding to those of the anchoring hole, said anchoring member having a leading and a trailing end portion, an interior extending between said end portions, and an internal thread in said interior at said trailing end portion, said cap member externally embracing said trailing end portion of said anchoring member upon insertion of said anchoring element into the anchoring hole through an open end thereof so that said cap member supports said anchoring element at the open end of the anchoring hole with clearance between the latter and said anchoring member and closes the open end of the clearance; and means for filling the clearance with a body of hardenable material for the latter to harden in the clearance about said anchoring member to thereby anchor said anchoring element in the anchoring hole, including at least one flow-through passage passing through said leading end portion of said anchoring member between said interior of the latter and the clearance, shielding means adapted to communicate with said passage for introducing the hardenable material thereinto and through the same into the clearance and to shield said internal thread of said anchoring member from contact with the hardenable material, and venting means at said cap member communicating the clearance with the exterior of the support structure and operative for venting air which is present in the anchoring hole and displaced by the hardenable material as the clearance is filled with said body.

2. The arrangement of claim 1, wherein said shielding means comprises a stoppage valve located in said interior, said stoppage valve having valve flaps bounding a center hole which is in communication with said flow-through passage.

3. The arrangement of claim 1, wherein said shielding means comprises a cone-shaped valve received in said flow-through passage provided on said anchoring member.

4. The arrangement of claim 1, wherein said cap member has a sleeve-shaped portion slightly larger than said anchoring hole so as to be frictionally wedged therein, and a trailing end located adjacent said sleeve-shaped portion thereof, said trailing end having a flange portion abutting against the support structure.

5. The arrangement of claim 1, wherein said anchoring element has attachment means for securing said cap member to said anchoring member.

6. The arrangement of claim 4, wherein said venting means comprises at least one narrow slit having an axially-directed section on said sleeve-shaped portion, and a radially-directed section on an underside of said flange portion which abuts against said support structure, which extends to the rim of said flange portion.

7. The arrangement of claim 6, wherein said cap member has an extension portion extending into said anchoring hole towards the bottom thereof, and wherein said axially-directed section of said at least one narrow slit extends along said extension portion of said cap member.

8. The arrangement of claim 1, wherein said cap member has an annular groove having an open end facing towards said clearance.

9. The arrangement of claim 1, wherein said cap member is of synthetic plastic material, and wherein said cap member further includes a sleeve-shaped portion and a resilient sealing lip means located exteriorly of said sleeve-shaped portion for sealing said anchoring hole.

10. The arrangement of claim 1; said shielding means comprising a sleeve element having a sleeve-shaped portion received in said interior and extending towards said leading end of said anchoring member.

11. The arrangement of claim 10, wherein said sleeve-shaped portion of said sleeve element has a tapered front end portion which abuts against said leading end of said anchoring member.

12. The arrangement of claim 11, wherein said tapered front end has valve closure means.

13. The arrangement of claim 11, wherein said sleeve element has a rear collar end located outwardly of said interior bore, and an interior passage extending from said rear collar end through said sleeve-shaped portion of said sleeve element towards said tapered front end thereof and also being in communication with said flow-through passage provided at the leading end portion of said anchoring member, said rear collar end being configurated to receive an injection device.

14. The arrangement of claim 13; and further comprising covering means adapted to be received in said rear collar end of said sleeve element for preventing outflow of the hardenable substance from said interior passage of said sleeve element.

15. The arrangement of claim 14, wherein said covering means comprises a covering cap connected to said sleeve element by means of an injection-molded thread.

16. The arrangement of claim 1; and further comprising an insert element having a sleeve-shaped portion received in said interior and extending towards said leading end portion of said anchoring member.

17. The arrangement of claim 16, wherein said sleeve-shaped portion of said insert element has an outer thread which is configurated to thread onto said internal thread provided in said interior at said trailing end portion.

18. The arrangement of claim 16, wherein said insert element has a limiting flange portion at its trailing end which abuts against the trailing end of said anchoring member.

19. The arrangement of claim 18, wherein said insert element has a trailing end and an interior passageway extending from its leading flange portion towards said leading end thereof, said leading end being tapered to receive an anchoring screw.

20. The arrangement of claim 19, wherein said interior passage has an inner threaded section having a woodscrew pitch for receiving a wood-type anchoring screw.

21. The arrangement of claim 19, wherein said interior passageway is provided with longitudinal ribs.

22. The arrangement of claim 19, wherein said insert element is of synthetic plastic material, and wherein said leading end of said insert element has a slit in communication with said interior of said anchoring member.

23. The arrangement of claim 1, wherein said leading end portion of said anchoring member further comprises a radially-constricted neck portion.

24. The arrangement of claim 1, wherein said leading end portion of said anchoring member comprises a plurality of radially-constricted portions.

25. A method of anchoring objects to support structures, comprising the steps of forming an anchoring hole in a support structure; inserting an anchoring element including a collar-shaped cap member and a tubular anchoring member having a flow-through passage at a leading end and an internal thread at a trailing end thereof, into said anchoring hole so that said cap member is lodged in an open end of said anchoring hole so as to externally embrace said trailing end to support said anchoring element in said anchoring hole with clearance between the latter and said anchoring member and to close said open end; filling said clearance with a body of hardenable material for the latter to harden in said clearance about said anchoring member to thereby anchor said anchoring element in said anchoring hole, including guiding said hardenable material through the interior of said anchoring member toward said passage and shielding said internal thread of said anchoring member from contact with the hardenable material, and venting air entrapped in said anchoring hole upon insertion of said anchoring element thereinto through said open end past said cap member during said introducting step as the air is being displaced by said hardenable material; preventing backflow of said hardenable material from said clearance into said interior; and attaching an object to said anchoring element upon hardening of said hardenable material, including threading an attaching member having external thread into said internal thread of said anchoring member.

26. The method of claim 25, wherein said introducing step injecting comprises inserting an injection device into an interior of said anchoring member, said interior being in communication with said flow-through passage provided on said anchoring member.

27. The method of claim 25, wherein said step of preventing comprises mounting a cone-shaped valve in said flow-through passage after the introducing step has been completed.

28. The method of claim 25, wherein said step of preventing comprises mounting a stoppage valve in said interior of said anchoring member upstream of said flow-through passage.

29. The method of claim 25; wherein said introducing step includes inserting a tapered sleeve element into said interior of said anchoring member until a leading end of said tapered sleeve element abuts against said anchoring member.

30. The method of claim 29, wherein said step of injecting includes introducing an injection device into an interior passage of said tapered sleeve element which is in communication with said flow-through passage; and further comprising the step of withdrawing said tapered sleeve element and the hardenable substance contained within its interior passage after the substance has hardened so as to maintain the interior bore of said anchoring member free of insertion for said attaching member.

31. The method of claim 30; and further comprising the step of covering said interior passage of said tapered sleeve element after said introducing step has been completed.

32. The method of claim 25; wherein said threading step includes threading a plastic material insert element into said interior provided in said anchoring member, and the subsequent step of screwing a wood-type anchoring screw into an interior threaded passageway of said insert element.

33. The method of claim 25; and further comprising the step of perforating identations provided on said anchoring member so as to form a plurality of flow-through passages.

34. The method of claim 25; and further comprising the step of rolling a metallic plate into a cylindrical configuration so as to form said anchoring member.

* * * * *